May 14, 1963  M. C. TANNER  3,089,756
LIQUID-LIQUID CONTACTING APPARATUS
Filed Jan. 9, 1958
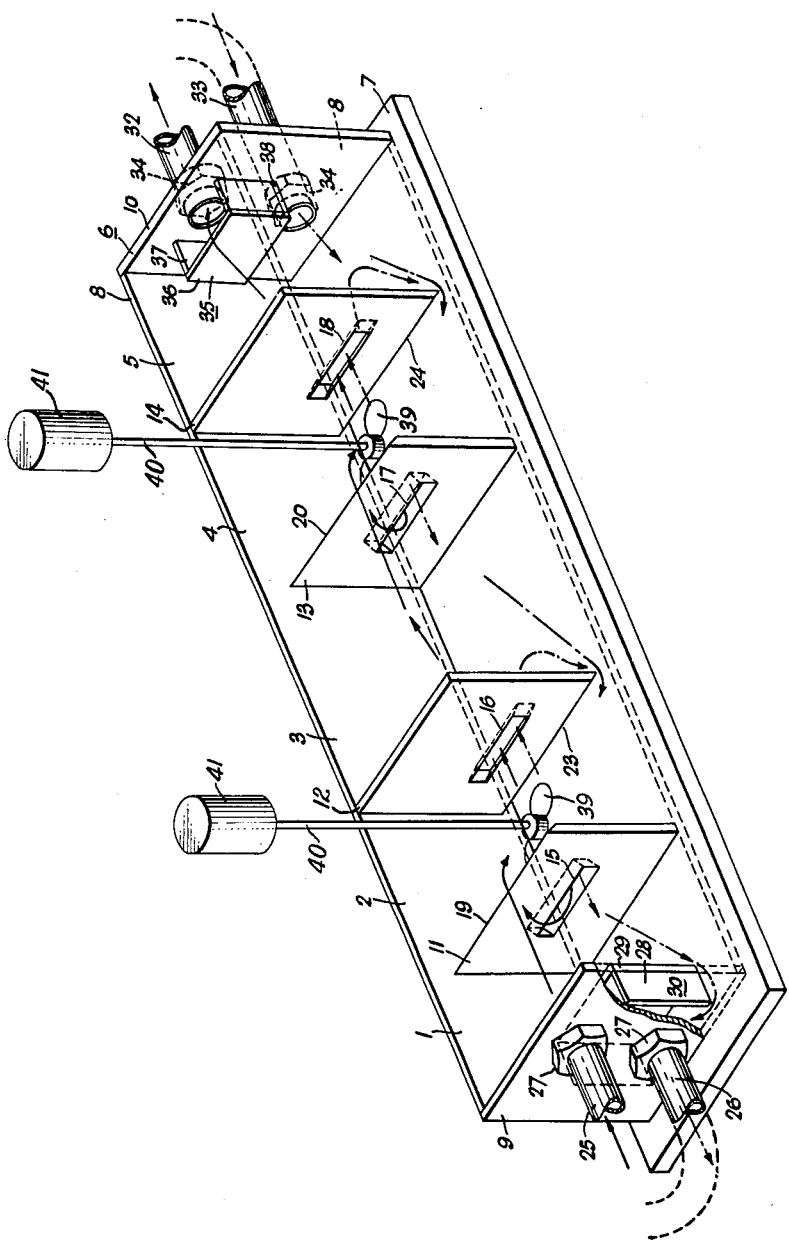
INVENTOR
MAURICE CHARLES TANNER
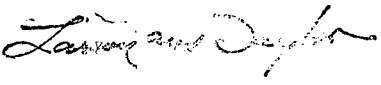
ATTORNEYS

# United States Patent Office 3,089,756
Patented May 14, 1963

3,089,756
LIQUID-LIQUID CONTACTING APPARATUS
Maurice Charles Tanner, Mirehouse, Whitehaven, England, assignor to United Kingdom Atomic Energy Authority, London, England
Filed Jan. 9, 1958, Ser. No. 707,996
Claims priority, application Great Britain Jan. 10, 1957
1 Claim. (Cl. 23—270.5)

This invention relates to liquid-liquid contacting apparatus and is concerned with new forms of mixer-settler liquid contacting apparatus.

According to the invention a mixer settler for contacting two substantially immiscible fluid phases of differing densities comprises alternate mixer and settler compartments, means permitting mixed phase fluid flow from mixer compartments in both directions into adjacent settler compartments, means permitting light phase flow from settler compartments into adjacent mixer compartments in one direction and means permitting heavy phase flow from settler compartments into adjacent mixer compartments in the other direction.

One embodiment of the invention will now be described by way of example with reference to the single FIGURE of the accompanying drawing, which is of isometric form.

In the drawing there is shown a mixer-settler arrangement comprising five compartments, viz. settler compartments 1, 3 and 5 and mixer compartments 2 and 4. Structurally the mixer settler is in the form of a long square section trough or box 6 having a base 7, longitudinal side walls 8 and end walls 9 and 10 (one of the side walls 8 is shown in dotted outline to expose the inside of the box 6). The box 6 is transversely divided into the five compartments 1, 2, 3, 4 and 5 by partitions 11, 12, 13 and 14. The partitions 11, 12, 13 and 14 have angled mixed phase ports 15, 16, 17 and 18 for the passage of mixed phase from mixer compartments into adjacent settler compartments. The partitions 11 and 13 are lower than the partitions 12 and 14, the upper bevelled edges of the partitions 11 and 13 forming overflow weirs 19 and 20 for the passage of light phase from the settler compartment 1 into the mixer compartment 2 and from the settler compartment 3 into the mixer compartment 4. The partitions 12 and 14 do not reach to the base 7 of the box 6 and the lower edges of these partitions 12 and 14 are bevelled thus forming ports 23 and 24 for the passage of heavy phase from the settler compartment 3 into the mixer compartment 2 and from the settler compartment 5 into the mixer compartment 4. Pipes 25 and 26 connect with the settler compartment 1 through the end wall 9 into which they are screwed and locked by nuts 27. The pipe 25 provides for the entry of light phase into the settler compartment 1 and an underflow weir 28 comprising a plate 29 parallel to the end wall 9, and side plates 30 regulates the removal of heavy phase from the settler compartment 1 through the pipe 26. Pipes 32 and 33 connect with the settler compartment 5 through the end wall 10 into which they are screwed and locked by nuts 34. The pipe 33 provides for the entry of heavy phase into the settler compartment 5 and an overflow weir 35 comprising a plate 36 located parallel to the end wall 10, side plates and a base plate 38 regulates the removal of light phase from the settler compartment 5 through the pipe 32.

In use of the mixer settler light phase is admitted to the settler compartment 1 through the pipe 25 and heavy phase is admitted to the settler compartment 5 through the pipe 33. The flow of light phase through the mixer settler is as indicated by the solid arrows in the drawing, while the flow of heavy phase is as indicated by the chain dotted arrows. Light phase entering the settler compartment 1 from the pipe 25 tumbles over the weir 19 into the mixer compartment 2 where it is mixed with heavy phase entering the mixer compartment 2 from the settler compartment 3 through the port 23. The mixed phases pass through the mixed phase ports 15 and 16 into the settler compartments 1 and 3 respectively where settling occurs. The settled heavy phase in the settler compartment 1 is removed through the pipe 26 and the settled light phase is recirculated with fresh light phase into the mixer compartment 2. The heavy phase settling in the settler compartment 3 is recirculated through the port 23 into the mixer compartment 2 and the light phase settling in the settler compartment 3 tumbles over the weir 20 into the mixer compartment 4. This light phase is mixed with heavy phase entering the mixer compartment 4 from the settler compartment 5 through the port 24. The mixed phases pass through the mixed phase ports 17 and 18 into the settler compartments 3 and 5 respectively. The heavy phase settling in the settler compartment 3 passes through the port 23 into the mixer compartment 2 and the light phase settling in the settler compartment 3 is recirculated over the weir 20 into the mixer compartment 4. The heavy phase settling in the settler compartment 5 is recirculated to the mixer compartment 4 through the port 24 with fresh heavy phase entering the settler compartment 5 through the pipe 33. The light phase settling in the settler compartment 5 tumbles over the weir 35 and is removed through the pipe 32.

Mixing of the light and heavy phases in the mixer compartments 2 and 4 may be effected by conventional stirrers etc. or by the pulse mixing method described in our co-pending British application No. (1011/57) now British Patent No. 831,383, for example, the mixing of the phases in mixer compartments 2 and 4 can be achieved by paddles 39 mounted on vertical shafts 40 driven by motors 41.

I claim:

A mixer-settler apparatus for contacting two substantially immiscible liquids of differing densities comprising a horizontal chamber of elongated form and including a base, an even number of transverse partitions dividing said chamber into an odd number of alternate mixer and settler compartments and comprising alternate overflow weirs and underflow weirs, wherein each partition defines a weir wherein the partition of an overflow weir is fixed to said base and defines liquid passage means above the partition of the overflow weir, and the partition of an underflow weir is separated from said base and defines liquid passage means between the base and the partition of the underflow weir, said partitions being imperforate except at an intermediate level relative to said base whereat an angled port is defined, means defining two liquid connections in both the first and last compartments at both ends of the chamber, said first and last compartments being settler compartments, one of said connections in each compartment being above said intermediate level and the other of said connections in each compartment being below said intermediate level, and liquid mixing means in the mixer compartments.

References Cited in the file of this patent
UNITED STATES PATENTS

| | | |
|---|---|---|
| 1,297,171 | Holley et al. | Mar. 11, 1919 |
| 1,485,623 | Mayo | Mar. 4, 1924 |
| 2,121,318 | Evans | June 21, 1938 |
| 2,754,179 | Whatley | July 10, 1956 |
| 2,845,936 | Boynton et al. | Aug. 5, 1958 |